INVENTOR.
ALFRED ANDREA

United States Patent Office 3,669,813
Patented June 13, 1972

3,669,813
AUTO BODY SECTIONAL SHAPING FORMS
Alfred Andrea, 15 French Terrace,
Watertown, Mass. 02172
Filed Mar. 31, 1970, Ser. No. 24,301
Int. Cl. B32b 3/14
U.S. Cl. 161—37
4 Claims

ABSTRACT OF THE DISCLOSURE

Preshaped, interlocking sectional forms constructed of rigid plastic can be used to mold plastic used for repairing damage to automobile bodies.

SUMMARY OF THE INVENTION

In order to repair damaged automobile bodies, an application of plastic material (then plastically workable but hardenable after application) is made and the material roughed out to approximate shape. Preshaped, interlocking, sectional forms constructed of rigid plastic are then fitted to the damage. The form is pressed against the plastic while it is deformable, thus making cut-out work, line, groove or recess which is perfectly molded and aligned. Only minimal sanding and refinishing remains. This reduces the time required in making repairs by two-thirds or more.

DETAILED DESCRIPTION OF PREFERRED EMBODIMENTS

Figure 1:
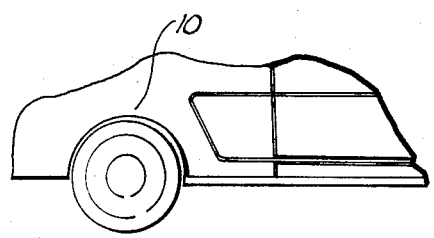
FIG. 1 shows a rear wheel body section of an automobile.
Figure 2:
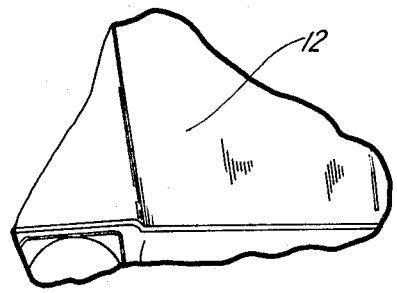
FIG. 2 shows a front hood top section thereof.
Figure 4:
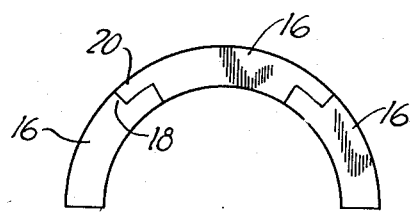
FIG. 4 shows an assembly of forms in accordance with my invention.
Figure 3:
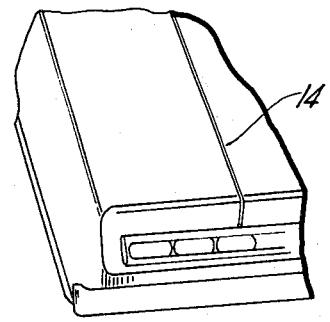
FIG. 3 shows a rear trunk top section thereof.
Figure 5:
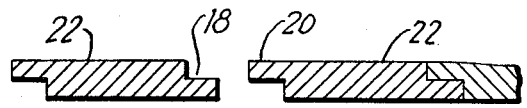
FIG. 5 is a detail view of other forms in accordance with my invention.
Figure 6:
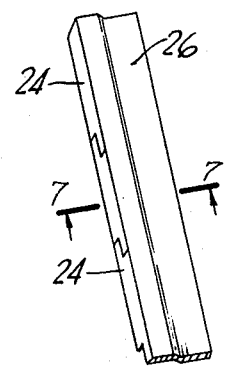
FIG. 6 is a detail view of yet another form in accordance with my invention.
Figure 8:
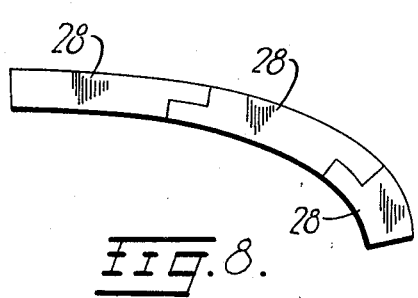
FIG. 8 is a detail view of yet other forms in accordance with my invention.
Figure 7:
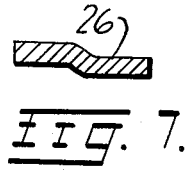
FIG. 7 is a cross section taken along line 7—7 in FIG. 6.

Referring now to FIGS. 1–8, FIGS. 1–3 show at 10, 12 and 14 respectively difficult areas for repair of body damage.

Curved interlocking plastic molded parts 16 can be joined by mating recesses 18 and extensions 20 to form a portion of a circle to repair a part for a wheel; parts 22 which are flat can be joined together in the same manner to form a panel; parts 24 can be joined together to form a section with a ridge 26; and curved parts 28 can be joined together to form a hood or the like.

These parts or forms can be used to repair damaged automobile bodies in the manner and with the advantages previously discussed.

While I have described my invention with particular reference to the drawings, such is not to be considered as limiting its actual scope.

Having thus described this invention, what is asserted as new is:

1. Apparatus for reforming a damaged surface portion of an automobile body, comprising a shaped molding member having a surface corresponding to the desired surface contour which said body portion is to assume and having means for interlocking with other molding members to form, when interlocked, a rigid mold having a generally continuous molding surface for conforming a yieldable but hardenable molding composition to the surface configuration which said damaged portion is to assume when repaired.

2. Apparatus according to claim 1 in which each molding member has at least one recess formed thereon for receiving a projecting portion of a member to which it is to be locked and at least one projecting portion thereon for mating with a recess of the member to which it is to be interlocked whereby each said member may be securely locked to other members to form said molding surface.

3. Apparatus according to claim 2 in which each said molding member has a molding surface corresponding to a distinct preselected portion of an automobile body surface whereby body portions of substantial extent may be reformed by selectively combining said members to form a molding surface of the desired shape and extent.

4. Apparatus for reforming a damaged surface portion of an automobile body, comprising a plurality of shaped, interlocking molding members forming, when interlocked, a rigid mold having a generally continuous molding surface for conforming a yieldable but hardenable molding composition to the surface configuration which said damaged portion is to assume when repaired.

References Cited
UNITED STATES PATENTS
3,474,584 10/1969 Lynch _____ 161—151 X
1,933,279 10/1933 Quarnstrom _____ 161—37 X JOHN T. GOOLKASIAN, Primary Examiner
J. C. GIL, Assistant Examiner U.S. Cl. X.R.
18—1 R; 161—48, 116, 118; 264—36, 265